United States Patent Office 2,929,791
Patented Mar. 22, 1960

2,929,791
CRAYON FOR DETECTION OF G AGENTS

Robert W. Pfeil, Columbus, Ohio, assignor, by mesne assignments, to the United States of America as represented by the Secretary of the Army No Drawing. Application April 6, 1959
Serial No. 804,551

2 Claims. (Cl. 252—408)

This invention herein described may be manufactured and used by or for the Government of the United States of America for governmental purposes without the payment to me of any royalty thereon.

This invention relates to the detection of toxic chemical warfare agents of the class known as "G agents." Important members of this class are GB or sarin (isopropyl methylphosphonofluoridate), GA or tabun (ethyl methylphosphoroamido cyanidate), GD (pinacolyl methylphosphonofluoridate), and GF (cylohexyl methyphosphonofluoridate). It relates specifically to a composition suitable for the detection of those agents which can be employed in the form of a crayon or chalk stick. A mark can be made on any suitable surface, such as a wall, and will change color to magenta or purple on exposure to the agent.

Fischer, Miller, Sass and Witten, in U.S. Patent 2,867,509, granted January 6, 1959, have shown that diisonitrosoacetone and its sodium and amine salts exhibit a color change on exposure to very minute quantities of the G agents, and can be used as detectors for those agents. It has previously been known to incorporate detecting compounds for these agents in a chalk or crayon. We have found that the identity of the other ingredients of the chalk greatly affects the sensitivity of the composition for its intended purpose. We obtain particularly good results by the use of a chalk of substantially the following composition.

| Ingredient: | Percent by weight |
|---|---|
| Disodium diisonitrosoacetone .6H$_{20}$ | 20 |
| Ortho-tolidine | 20 |
| Urea | 15 |
| Lithium stearate | 27 |
| Lithium chloride | 3 |
| Calcium oxide | 15 |

Attention is particularly called to the lithium stearate. Soaps of this general type have been previously used as lubricants in chalks to improve the marking characteristics. We find, however, that lithium stearate has unobvious effects on the sensitivity. Substitution of lithium stearate for magnesium stearate, previously believed to be the best soap for this purpose, increased the sensitivity about six fold. Calcium stearate was equivalent to magnesium stearate as regards sensitivity and poorer in physical properties.

Certain of the ingredients of the composition may be varied. For example, calcium hydroxide may be substituted for calcium oxide, with a slightly decreased sensitivity, but an increased life in storage. Lithium bromide may be substituted for lithium chloride, in equal proportions, but with no improvement in results and at a higher cost. Calcium chloride may be substituted for lithium chloride at lower cost but with somewhat poorer results. The proportions given are not strictly critical, but should be fairly closely approximated.

The mark of a crayon above described will detect GB in air at a concentration of about 1 "gamma" (microgram) per liter and gives a CT value of about 6 gamma minutes per liter. That is, it shows a change in color (turns purple or magenta) when the product of the concentration (C) in gamma per liter multiplied by the exposure time in minutes (T) equals 6.

I claim:

1. A composition for detecting the presence of G agents in the air consisting essentially of the following ingredients in substantially the following proportions, disodium diisonitrosoacetone .6H$_{20}$, 20%; orthotolidine, 20%; urea, 15%, lithium stearate, 27%, a compound selected from the class consisting of lithium chloride, calcium chloride and lithium bromide, 3%; a compound selected from the class consisting of calcium oxide and calcium hydroxide, 15%.

2. A crayon for use in detecting the presence of G-agents in the air consisting essentially of a compressed stick of the following ingredients in substantially the following proportions, disodium diisonitroso-acetone .6H$_{20}$, 20%; orthotolidine, 20%; urea, 15%, lithium stearate, 27%; a compound selected from the class consisting of lithium chloride, calcium chloride and lithium bromide, 3%; a compound selected from the class consisting of calcium oxide and calcium hydroxide, 15%.

References Cited in the file of this patent
UNITED STATES PATENTS

| 2,865,719 | Kramer | Dec. 23, 1958 |
| 2,867,509 | Fischer et al. | Jan. 6, 1959 |